(12) United States Patent
Mauri et al.

(10) Patent No.: US 9,175,184 B2
(45) Date of Patent: Nov. 3, 2015

(54) ORGANIC-INORGANIC COMPOSITION FOR THE VAPOUR RELEASE OF ALKALI OR ALKALI-EARTH METALS

(71) Applicant: SAES GETTERS S.P.A., Lainate, MI (US)

(72) Inventors: Luca Mauri, Bovisio Masciago (IT); Alessandro Gallitognotta, Origgio (IT); Alberto Coda, Gerenzano (IT)

(73) Assignee: SAS GETTERS S.P.A., Lainate (MI) (IT)

( * ) Notice: Subject to any disclaimer, the term of this patent is extended or adjusted under 35 U.S.C. 154(b) by 0 days.

(21) Appl. No.: 14/352,446

(22) PCT Filed: Nov. 9, 2012

(86) PCT No.: PCT/IB2012/056290
§ 371 (c)(1),
(2) Date: Apr. 17, 2014

(87) PCT Pub. No.: WO2013/068975
PCT Pub. Date: May 16, 2013

(65) Prior Publication Data
US 2014/0283709 A1    Sep. 25, 2014

(30) Foreign Application Priority Data
Nov. 11, 2011  (IT) .............................. MI2011A2051

(51) Int. Cl.
*H01L 31/0224* (2006.01)
*C09D 105/00* (2006.01)
*H01J 7/18* (2006.01)
*H01J 7/20* (2006.01)
*C09D 7/12* (2006.01)

(52) U.S. Cl.
CPC ............ *C09D 105/00* (2013.01); *C09D 7/1216* (2013.01); *C09D 7/1233* (2013.01); *H01J 7/183* (2013.01); *H01J 7/20* (2013.01)

(58) Field of Classification Search
CPC ....................................................... H01L 51/30
See application file for complete search history.

(56) References Cited

U.S. PATENT DOCUMENTS

2006/0088663 A1 *    4/2006   Cho et al. ...................... 427/384

FOREIGN PATENT DOCUMENTS

| CN | 101621082  | * | 1/2010 |
| CN | 101621082  |   | 6/2010 |
| IT | WO02/093664 | * | 11/2002 |
| WO | 2008/099256 |   | 8/2008 |
| WO | 02/093664  |   | 11/2012 |

OTHER PUBLICATIONS

PCT International Search Report mailed on Mar. 6, 2013 for PCT/IB2012/056290 filed on Nov. 9, 2012 in the name of SAES GETTERS S.P.A.
PCT Written Opinion mailed on Mar. 6, 2013 for PCT/IB2012/056290 filed on Nov. 9, 2012 in the name of SAES GETTERS S.P.A.
PCT International Preliminary Report on Patentability mailed on Oct. 25, 2013 for PCT/IB2012/056290 filed on Nov. 9, 2012 in the name of SAES GETTERS S.P.A.

* cited by examiner

*Primary Examiner* — Melvin C Mayes
*Assistant Examiner* — Colette Nguyen
(74) *Attorney, Agent, or Firm* — Steinfl & Bruno LLP

(57) ABSTRACT

A composition of precursors for the release of vapors of alkali or alkali-earth metals is described. The composition has at least a compound of alkali or alkali-earth metal, at least a reducing agent and optionally an absorbing material, all in the form of powders, dispersed in a viscous matrix of hybrid organic-inorganic type. Dispensers for the release of these metals obtained through the composition and micro-electronic devices are also described.

13 Claims, No Drawings

ORGANIC-INORGANIC COMPOSITION FOR THE VAPOUR RELEASE OF ALKALI OR ALKALI-EARTH METALS

CROSS REFERENCE TO RELATED APPLICATIONS

The present application is the US national stage of International Patent Application PCT/IB2012/056290 filed on Nov. 9, 2012 which, in turn, claims priority to Italian Patent Application MI2011A002051 filed on Nov. 11, 2011.

The present invention relates in a first aspect thereof to an organic-inorganic composition containing compounds of alkali or alkali-earth metals that can be deposited through the common techniques for dispensing liquid compositions of varying viscosity and can, after its consolidation, release alkali or alkali-earth elements in their metallic form. In a second aspect, the invention relates to dispensers for alkali metals obtained by using said composition and in a third aspect to electronic devices containing said dispensers.

A further important aspect is related to the modulation of the release temperature of the alkali metal according to the specific particle size/surface of the reducing powders and/or of the alkali or alkali-earth compounds.

In the field of electronic devices in general it is necessary for their operation to deposit within them alkali or alkali-earth metals, whether they are intended to have an active role within the peculiar functional structure of the device itself, to have a doping role with regard to the electronic properties of a layer constituting said functional structure, or simply to exercise a role of removing oxidizing species from the atmosphere enclosed within the structure that encapsulates the device.

Among the electronic devices at which the present invention is aimed, there may be mentioned photocathodes, cathode-ray tubes, atomic clocks, atomic interferometers, atomic gyroscopes, refrigeration units based on the tunnel effect and all those generally included in the definition of microelectromechanical or optoelectronic devices (respectively designated by the acronyms MEMs and MOEMs, from Micro-Electro-Mechanical and Micro-Opto-Electro-Mechanical).

When the release of the alkali or alkali-earth metal can or should take place within the continuous manufacturing process of the electronic device, there are generally used sources connected to a current generator and inserted inside a process chamber. These sources consist in their most basic form of refractory material crucibles containing powders which serve as precursors for the release of the metal. However, they have limitations in controlling the process of evaporation of the metal, due to the difficulty of ensuring its complete control as a result of thermal inhomogeneities within the devices concerned, thus making difficult to accurately dose the metal during the release process.

Especially in the field of miniaturized electronic devices, particularly consolidated is also the use of particular dispenser elements, generally filiform. The filiform configuration is generally well integrated with the manufacturing process of some devices such as, for example, photocathodes. However, such dispensers are characterized by a variability in the control of their evaporable metal yield due to the limitations related to the mechanical production of a dispenser of very small dimensions and containing mixtures of different powders. Furthermore, the filiform dispensers most widely used up to now essentially contain chromates as precursor compounds of the metal, which, however, are not well accepted for their potential environmental impact as well as for being subject to subsequent local regulations increasingly limiting (if not inhibiting) their use.

The international patent application published under number WO 02/093664, in the name of the applicant, describes the use of particular compositions that from the environmental point of view are considered preferable compared to said chromates and for this reason the dispensers containing them are defined in the industry as "green dispensers". However, the dispensers described in said publication from the structural point of view recall for example the same filiform dispensers or their technical developments aimed at achieving further improvements with regard to the control of the evaporation process and, especially, the maximization of the quantity of alkali or alkali-earth metal in order to allow a better integration in manufacturing processes with particular characteristics, such as for example the production of displays based on the technology known in the field as OLEDs (acronym for Organic Light Emitting Diode). Therefore if on one hand filiform dispensers are re-proposed, with their limits already described, the variants presented could not be easily used in many manufacturing processes of miniaturized electronic devices since they would require at least a partial redesign of the latter that generally is not well accepted by the manufacturer, or for example involve the use of different or particular electronic monitoring equipment with respect to those already available, or at least some modification of some process conditions within the manufacturing chamber.

The international patent application published under number WO 2008/099256, in the name of the applicant, proposes to solve this problem of integration with the manufacturing processes by providing the deposit of the composition of precursors for the release of the metal in combination with a protective getter deposit that permits its inevitable exposure to air for longer or shorter periods depending on the end device to be produced. However, the deposition techniques suitable for the types of deposits described herein are lithographic, chemical evaporation (known in the industry with the acronym CVD, Chemical Vapour Deposition) or physical vapour evaporation (the latter well known in the field as "sputtering") and they can be used to obtain on a substrate multi-layer structures of the precursor-getter type or to obtain a single layer resulting from their co-deposition. In both cases they require the optimization of various parameters of the deposition processes according to the materials to be used, limiting their potential use. In fact, given the considerable variety of possible electronic devices, the positioning of these deposits for the release of alkali or alkali-earth metals may require particular geometries thereof, specific placements in the end device as well as the use of different types of substrates. For the intended deposition processes these, as well as other variations and optimizations easily deducible by a person skilled in the art, require time and economic efforts that limit their interest and application in manufacturing processes on a large scale.

The present invention allows to overcome the limitations of the prior art for obtaining deposits of compositions useful for the release of alkali and alkali-earth metals in the production of electronic devices, with particular reference to miniaturized ones.

It consists, in a first aspect thereof, in a dispensable composition of precursors for the release of alkali or alkali-earth metals containing at least a compound of alkali or alkali-earth metal and at least a reducing agent, characterized in that said compound and said reducing agent are dispersed in the form of powders within a hybrid organic-inorganic binder.

The viscosity of the precursor composition object of the present invention is preferably between 50 and 5000 cP and allows to obtain deposits of materials which may be consolidated through thermal processes at temperatures between 100 and 400° C. whereas the release takes place in correspondence of thermal processes at a temperature at least 50° C. higher than said temperatures of consolidation and typically between 300 and 800° C.

The compounds of alkali or alkali-earth metals suitable for use in the present invention may be compounds as zirconates, silicates, tantalates, niobates, tungstates, molybdates or titanates of alkali or alkali-earth metals or alloys in which one metal of said alloys is selected among alkali-earth metals such as those of binary systems Ca—Al or Cu—Mg, while the reducing agents may be selected among metallic elements such as titanium, zirconium, silicon, aluminum, tantalum and their alloys.

In particular, compounds which may be considered preferred for use in the present invention result to be the molybdates or titanates of alkali or alkali-earth metals. For the application of the present invention it is preferred that the compounds of alkali or alkali-earth metals constitute a quantity comprised between 5 and 45% by weight with respect to the total weight of the composition.

As far as the reducing agents are concerned, if they are selected in the form of alloys, Zr-based getter alloys are considered preferable, such as for example Zr—Al alloys, being capable to perform not only the task of reducing the selected compound, but also the function of absorbing gaseous species that may be undesired or harmful during the manufacturing process or the life of the end device for which the composition is used.

In a possible variant, the use of a component with a primarily reducing function can be provided, selected from those listed above, in association with a getter alloy that instead has a primarily absorbing function, as for example is the case of metal alloys such as for example those of the binary zirconium-aluminum system or of the ternary zirconium-vanadium-iron system.

In the context of the present invention it results particularly preferred to use compositions in which the ratio of the concentrations by weight between the compound of alkali or alkali-earth metal and the reducing and getter agents is between 1:6 and 2:1, preferably between 1:4 and 1:1.

In a preferred embodiment the hybrid organic-inorganic binder used in the present invention is characterized by the presence of at least one organic component, which acts as a thickener, and at least one inorganic component, which acts as a stabilizer, both dispersed in a solvent or in a mixture of solvents. The solvents used in the present invention can be water, organic solvents or their mixtures. Examples of organic solvents suitable for use in the present invention can be selected from propyl and isopropyl alcohol, acetone, ethers (e.g. propyl ether), propylene glycol ethers, such as those commonly known as DPM (acronym for Di-Propylene-glycol-Monomethyl ether) and DPNB (acronym for Di-Propylene-glycol-N-Butyl ether). Said binder preferably constitutes a percentage by weight included between 30 and 60 wt % with respect to the total weight of the composition.

As to the selection of the organic thickener commonly available in the market, particularly suitable result to be cellulose and alginates, in their various families, as well as thickeners of vegetable nature, agar-agar, xanthan gum. The inorganic stabilizer, instead, can be selected among those based on colloidal silica or zeolites, commonly available in the market.

Finally, the composition can provide for the use of additives useful to improve the adhesion to the substrate on which it must be deposited. The selection of such additives may be among those commonly known in the art (such as siloxane additives or vinyl resins) and their quantity in the composition preferably does not exceed 5% by weight with respect to the total weight, it being understood that the concentration of each of them can not exceed 3% by weight with respect to the total weight.

In a second aspect thereof, the invention consists in a dispenser for the release of alkali or alkali-earth metals which is made up of a substrate and a deposit of a composition of precursors for the release of alkali or alkali-earth metals containing at least an alkali or alkali-earth metal compound and at least a reducing agent, characterized in that said compound and said reducing agent are dispersed in the form of powders within a hybrid organic-inorganic binder, as well as in the manufacturing method of said dispenser.

The substrates suitable for depositing the composition (as defined in the first aspect of the present invention) can be selected from the usual materials used for the encapsulation of the devices at which it is aimed, as for example silicon, glass, silica, ceramics, kovar, quartz, sapphire, pyrex, germanium, silicon carbide, ITO (acronym for Indium Tin Oxide), metals.

The deposits, in the form of continuous or discrete deposits on the substrate, can be obtained through deposition techniques commonly known in the field, among which preferred are those known under the names of screen printing, spray-coating, micro-drop dispensation or inkjet. The devices of the present invention provide for thicknesses preferably between 1 and 250 microns.

The dispenser, for its use within the manufacturing processes or for the insertion in the end devices in which the release of the alkali or alkali-earth metal must take place, provides that the deposit is consolidated, preferably prior to said release, through a thermal process, usually at temperatures between 100 and 400° C. for times between 1 and 240 minutes, a process which allows to eliminate at least 95% of the total amount of solvent present in the composition. Such treatments can also occur in particular conditions such as those that include conditions of vacuum or exposure to inert gases.

The consolidation temperatures are considerably lower than those corresponding to the release of the metal: the latter, in fact, depending on the metal to be released and on the selection of the reducing (and/or getter) material, as well as on the selection of the particle size of the reducing agent, are comprised between 300 and 800° C. In particular, in order to achieve an effective release at temperatures not too high, according to the present invention it is preferable to use a particle sizes smaller than 250 microns, and the use of powders not greater than 125 microns results particularly preferred.

In a third aspect thereof, the invention consists in a device containing a dispenser deposit for the release of alkali or alkali-earth metals, said deposit being positioned in correspondence of at least one surface in the internal volume of the device and consisting in a composition of precursors for the release of alkali or alkali-earth metals containing at least a compound of alkali or alkali-earth metal and at least a reducing agent, characterized in that said compound and said reducing agent are dispersed in the form of powders within a hybrid organic-inorganic binder.

The device object of the invention provides for the dispenser deposit to be located at a part or on the whole of the free surface that is present inside the structure in which it is encapsulated.

In accordance with the present invention, such devices may be photocathodes, cathode-ray tubes, atomic clocks, atomic interferometers, atomic gyroscopes, refrigeration units based on the tunnel effect and all those generally included in the definition of microelectromechanical or optoelectronic devices (respectively designated by the acronyms MEMs and MOEMs, from Micro-Electro-Mechanical and Micro-Opto-Electro-Mechanical).

The invention will be further illustrated by means of the following non-limiting examples.

EXAMPLE 1

In 27 ml of $H_2O$, were added 0,155 g of thickener (xanthan gum known under the trade name 1% CX91 T), and 0.5 g of adhesion additive (an amino-functional alkoxysilane available in the market with the trade name Addid 900®). Then, 1.5 g of DPNB and 1.5 g of DPM were added to the previous preparation. Finally, 25 g of titanium metal powder as reducing agent, 25 g of cesium molybdate $Cs_2MoO_4$ and 1.5 g of silica-based stabilizer (A972) were dispersed in the previous preparation.

Drops of the previously prepared composition were deposited on a silicon substrate using a syringe. Once deposited, the composition was dried at room temperature for 15 minutes. Then it was consolidated through a heat treatment for 60 minutes at 200° C.

The resulting paste deposited on the silicon substrate was then inserted in a crucible of an evaporation bench and through a thermocouple inside the crucible it was possible to record the temperature over time. A QCM instead made it possible to detect the moment at which the evaporation started. The release temperature observed experimentally was approximately 640° C.

EXAMPLE 2

In 27 ml of $H_2O$, were-added 0,155 g of thickener (xanthan gum known under the trade name 1% CX91 T), and 0.5 g of adhesion additive (an amino-functional alkoxysilane available in the market with the trade name Addid 900®). Then, 1.5 g of DPNB and 1.5 g of DPM were added to the previous preparation. Finally, 25 g of Zr—Al getter powder as reducing agent, 25 g of lithium titanate $Li_2TiO_3$ and 1.5 g of silica-based stabilizer (A972) were dispersed in the previous preparation.

Drops of the previously prepared composition were deposited on a silicon substrate using a syringe. Once deposited, the composition was dried at room temperature for 15 minutes. Then it was consolidated through a heat treatment for 60 minutes at 200° C.

The resulting paste deposited on the silicon substrate was then inserted in a crucible of an evaporation bench and through a thermocouple inside the crucible it was possible to record the temperature over time. A QCM instead made it possible to detect the moment at which the evaporation started. The release temperature observed experimentally was approximately 690° C.

EXAMPLE 3

In 27 ml of $H_2O$, were added 0,155 g of thickener (xanthan gum known under the trade name 1% CX91 T), and 0.5 g of adhesion additive (an amino-functional alkoxysilane available in the market with the trade name Addid 900®). Then, 1.5 g of DPNB and 1.5 g of DPM were added to the previous preparation. Finally, 25 g of Zr—Al getter powder as reducing agent, 25 g of cesium molybdate $Cs_2MoO_4$ and 1.5 g of silica-based stabilizer A972 were dispersed in the previous preparation.

Drops of the previously prepared composition were deposited on a silicon substrate using a syringe. Once deposited, the composition was dried at room temperature for 15 minutes. Then it was consolidated through a heat treatment for 60 minutes at 200° C.

The resulting paste deposited on the silicon substrate was then inserted in a crucible of an evaporation bench and through a thermocouple inside the crucible it was possible to record the temperature over time. A QCM instead made it possible to detect the moment at which the evaporation started. The release temperature observed experimentally was approximately 665° C.

The invention claimed is:

1. A composition containing precursors comprising at least a compound of alkali or alkali-earth metal, and at least a reducing agent,
    said compound and said reducing agent being dispersed in the form of powders within a hybrid organic-inorganic binder, said binder comprising at least an organic thickener component and at least an inorganic stabilizer component,
    wherein said precursors are suitable for the release of alkali or alkali-earth metals and said compound of alkali or alkali-earth metal is selected among zirconates, silicates, tantalates, niobates, tungstates, molybdates and titanates of alkali or alkali-earth metals,
    wherein the viscosity of said composition is between 50 cP and 5000 cP.

2. The composition according to claim 1, wherein the ratio between the weight concentrations of the alkali or alkali-earth metal compound and of the reducing agents is between 1:6 and 2:1.

3. The composition according to claim 1, wherein said inorganic stabilizer component is selected among those based on colloidal silica or zeolites.

4. The composition according to claim 1, wherein said reducing agent is selected among metallic elements comprising: titanium, zirconium, silicon, aluminum, tantalum or alloys thereof.

5. The composition according to claim 4, wherein said reducing agent is selected among alloys and said alloys belong to the zirconium-aluminum binary system or to the zirconium-vanadium-iron ternary system.

6. The composition according to claim 1, wherein said binder is present in a concentration in the range between 30% and 60% with respect to the weight of the precursor composition as a whole.

7. The composition according to claim 6, wherein said binder is contains a solvent selected among propyl and isopropyl alcohol, acetone, ethers, propylene glycol ethers.

8. A dispenser for releasing alkali or alkali-earth metals comprised of a substrate and a deposit of the precursor composition for the release of alkali or alkali-earth metals according to claim 1.

9. The dispenser for releasing alkali or alkali-earth metals according to claim 8, wherein said substrate is selected among silicon, glass, silica, ceramics, kovar, quartz, sapphire, pyrex, germanium, silicon carbide, ITO, metals.

10. A device containing a deposit of the composition for releasing alkali or alkali-earth metals according to claim 1, said deposit being positioned on at least one surface present in the internal volume of said device.

11. The device according to claim 10, wherein said device is selected among photocathodes, cathode-ray tubes, atomic clocks, atomic interferometers, atomic gyroscopes, refrigerating units based on the tunnel effect, MEMs and MOEMs.

12. The composition according to claim 1, wherein the ratio between the weight concentrations of the alkali or alkali-earth metal compound and of the reducing agents is between 1:4 and 1:1.

13. The composition according to claim 1, wherein said compound of alkali or alkali-earth metal is present between 5% and 45% by weight with respect to the total weight of the composition.

* * * * *